(12) United States Patent
Fletcher, III et al.

(10) Patent No.: US 7,143,611 B2
(45) Date of Patent: Dec. 5, 2006

(54) ROD-IN-TUBE OPTICAL FIBER PREFORM ASSEMBLY AND METHOD HAVING REDUCED MOVEMENT

(75) Inventors: Joseph P. Fletcher, III, Marietta, GA (US); Andrew W. Jones, Dacula, GA (US); Thomas J. Miller, Alpharetta, GA (US); Don H. Smith, Decatur, GA (US); Shunhe Xiong, Alpharetta, GA (US)

(73) Assignee: Fitel USA Corp, Norcross, GA (US)

( * ) Notice: Subject to any disclaimer, the term of this patent is extended or adjusted under 35 U.S.C. 154(b) by 395 days.

(21) Appl. No.: 10/665,623

(22) Filed: Sep. 19, 2003

(65) Prior Publication Data

US 2005/0064188 A1   Mar. 24, 2005

(51) Int. Cl.
*C03B 37/028* (2006.01)
*B32B 9/00* (2006.01)
(52) U.S. Cl. .............. 65/412; 65/435; 65/407; 428/375; 428/392; 385/123
(58) Field of Classification Search ............... 65/412, 65/435, 407; 385/123; 428/375, 392
See application file for complete search history.

(56) References Cited

U.S. PATENT DOCUMENTS

| | | | |
|---|---|---|---|
| 4,820,322 A | 4/1989 | Baumgart et al. | |
| 5,917,109 A * | 6/1999 | Berkey | 65/412 |
| 6,041,623 A * | 3/2000 | Fleming, Jr. | 65/391 |
| 6,460,378 B1 | 10/2002 | Dong et al. | |
| 6,701,753 B1 * | 3/2004 | Dong et al. | 65/412 |
| 2002/0108403 A1* | 8/2002 | Dong et al. | 65/384 |
| 2003/0024278 A1* | 2/2003 | Berkey et al. | 65/428 |

FOREIGN PATENT DOCUMENTS

| | | |
|---|---|---|
| EP | 1129999 A2 * | 9/2001 |
| JP | 2004182595 A * | 7/2004 |

* cited by examiner

*Primary Examiner*—Jill Gray

(57) ABSTRACT

Embodiments of the invention include an optical fiber preform assembly and a method for making optical fiber using the preform assembly. The assembly includes a preform core rod, at least one overclad tube formed around the preform core rod, a handle attached to one end of the overclad tube, and a refractory material positioned in the overclad tube between the preform core rod and the handle. The refractory material reduces if not prevents movement of the preform core rod into the handle during the fiber draw process. Preferably, the refractory material is made of, e.g., magnesium oxide and/or aluminum oxide, and has a melting point, e.g., greater than approximately 2000 degrees Celsius. Embodiments of the invention also include a method for making optical fiber using this preform assembly.

8 Claims, 4 Drawing Sheets

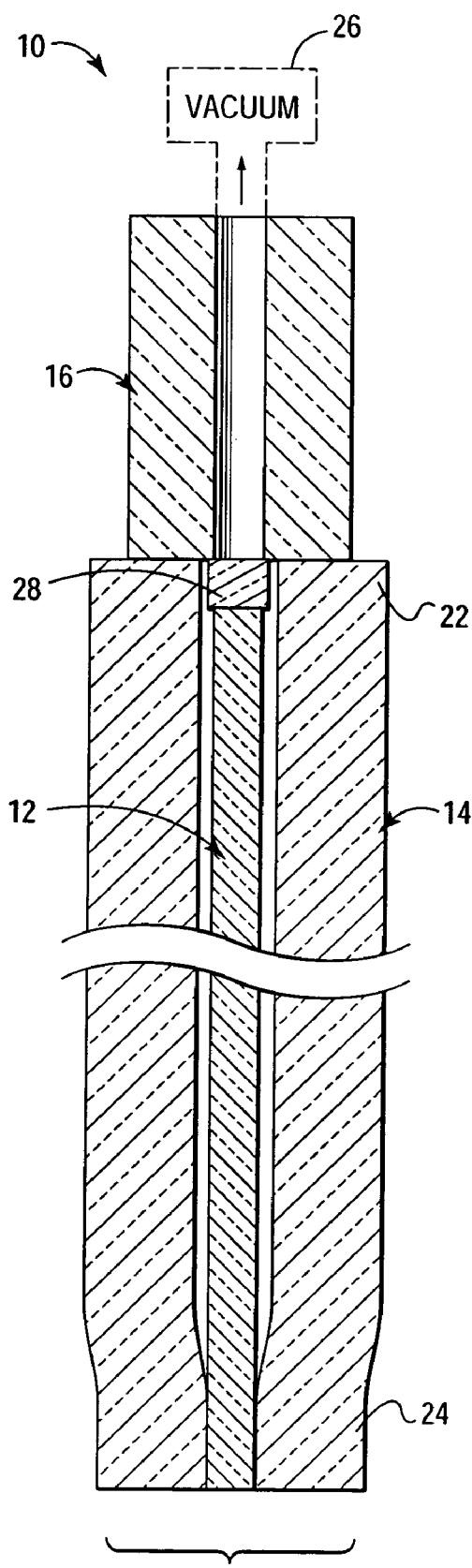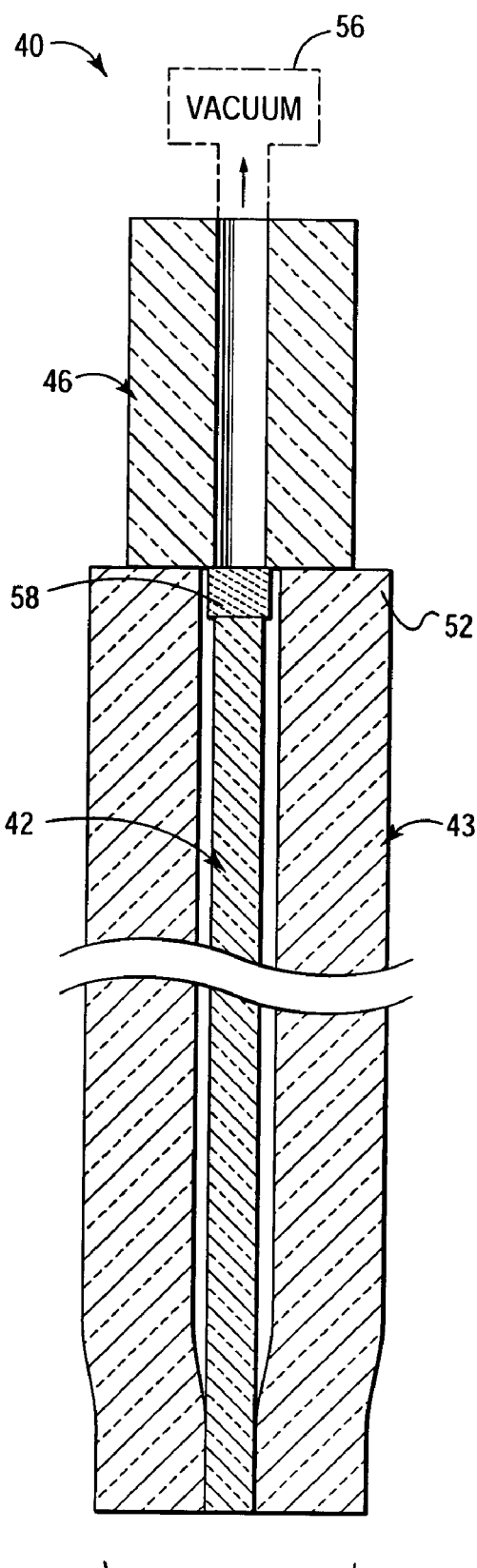

ROD-IN-TUBE OPTICAL FIBER PREFORM ASSEMBLY AND METHOD HAVING REDUCED MOVEMENT

BACKGROUND OF THE INVENTION

1. Field of the Invention

The invention relates to optical fiber preforms. More particularly, the invention relates to Rod-In-Tube (RIT) optical fiber preform assemblies and methods for reducing movement during optical fiber manufacture.

2. Description of the Related Art

Optical fibers typically are made by heating and drawing a portion of an optical preform usually comprising a solid glass rod with a refractive glass core surrounded by a protective glass cladding. Optical fibers drawn from the preform typically are protected further by one or more coatings applied to the cladding region.

Conventionally, several processes exist for fabricating optical preforms, including modified chemical vapor deposition (MCVD), vapor axial deposition (VAD) and outside vapor deposition (OVD). These processes form a solid rod typically referred to as the preform, the preform rod, the core rod or the preform core rod. Once the preform core rod is formed, optical fiber is drawn directly therefrom or, alternatively, one or more overclad layers are formed thereon prior to drawing optical fiber therefrom. The overclad layers are formed on the preform core rod, e.g., by collapsing a silica-based overclad tube or sleeve around the preform core rod. Such process typically is referred to as the Rod-In-Tube (RIT) process. See, e.g., U.S. Pat. No. 4,820,322, which is co-owned with this application, and hereby is incorporated by reference herein.

Often, the overclad tube is collapsed onto the preform core rod while the overclad tube and the preform core rod are mounted in a vertical lathe. Alternatively, according to the Overclad During Draw (ODD) technique, the overclad tube is collapsed onto the preform core rod in the draw tower furnace, which also is used to draw optical fiber from the resulting optical fiber preform. In the ODD technique, the preform core rod is inserted into an overclad tube and then the combined preform core rod and overclad tube is moved coaxially through the draw tower furnace, which causes the collapse of the overclad tube onto the preform core rod prior to the resulting preform portion having optical fiber drawn therefrom. The ODD technique also allows for more than one overclad tube to be collapsed onto the preform core rod in the draw tower furnace. See, e.g., U.S. Pat. No. 6,460,378, which is co-owned with this application, and hereby is incorporated by reference herein.

During fiber draw, it is important that relative movement of the preform core rod and the overclad tube be minimized, since such movement often varies the geometry of the core and cladding regions, which reduces the quality of the drawn fiber. Conventionally, a silica disc is placed between the end of the preform core rod and a restricted tube-shaped handle attached to overclad tube to prevent upward movement of the preform core rod into the interior of the handle. Such movement is inherent during the fiber draw process because of the pressure gradient established across the preform core rod and the overclad tube to collapse the overclad tube onto the preform core rod.

However, as the temperature of the preform core rod increases during its movement through the draw furnace, the silica disc and the preform core rod often become soft enough to flow into the interior of the handle. Accordingly, it would be desirable to have available an optical fiber preform assembly that reduces the relative movement of the preform core and the overclad tube during the fiber draw process.

SUMMARY OF THE INVENTION

The invention is embodied in an optical fiber preform assembly and a method for making optical fiber using the preform assembly. The assembly includes a preform core rod, at least one overclad tube formed around the preform core rod, a handle attached to one end of the overclad tube, and a refractory material positioned in the overclad tube between the preform core rod and the handle. Conventional preform assemblies often fail to keep the preform core rod from flowing into the handle as the preform assembly is heated during the fiber draw process. According to embodiments of the invention, the refractory material reduces if not prevents movement of the preform core rod into the handle during the fiber draw process. Preferably, the refractory material is made of, e.g., magnesium oxide and/or aluminum oxide, and has a melting point, e.g., greater than approximately 2000 degrees Celsius. Embodiments of the invention also include a method for making optical fiber using this preform assembly.

BRIEF DESCRIPTION OF THE DRAWINGS

FIG. 1 is a cross-sectional view of a conventional preform core rod assembly with a silica disc positioned between the end of the preform core rod and the handle;

FIG. 2 is a cross-sectional view of a preform core rod assembly according to an embodiment of the invention;

DETAILED DESCRIPTION OF THE PREFERRED EMBODIMENT

Figure 3A:
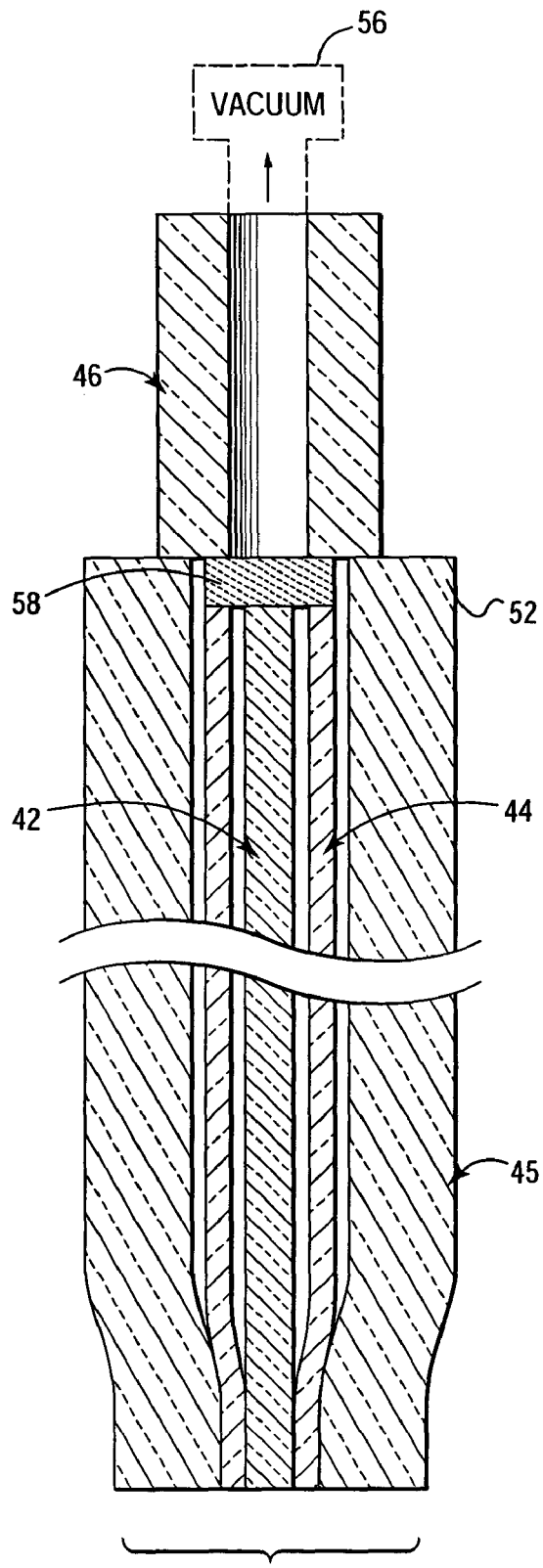
FIG. 3a is a cross-sectional view of a multitube preform core rod assembly according to an embodiment of the invention.

In the following description like reference numerals indicate like components to enhance the understanding of the invention through the description of the drawings. Also, although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

Referring to FIG. 1, shown is a cross-sectional view of a conventional preform core rod assembly 10. The assembly 10 includes a preform core rod 12 and an overclad tube 14, which are used to make an overclad preform core rod, e.g., according to a conventional Rod-In-Tube (RIT) process. The preform core rod 12 is positioned within the overclad tube 14 prior to the collapse of the overclad tube 14 around the preform core rod 12. The preform core rod 12 is made by any suitable process, including conventional processes such as modified chemical vapor deposition (MCVD) or vapor axial deposition (VAD). Typically, the preform core rod 12 is made of solid glass having a desired dopant profile to desirably alter its refractive index. The overclad tube 14 typically is made of pure silica, but can also include dopants to alter its refractive index. A handle 16 is attached or otherwise formed to a first end 22 of the overclad tube 14. The handle 16, which typically has a smaller outer diameter and inner diameter than those of the overclad tube 14, facilitates mounting the preform assembly 10 into a chuck or other appropriate holding device.

Once the preform core rod 12 is positioned as desired within the overclad tube 14, a second end 24 of the preform assembly 10 is sealed off, e.g., by a seal (not shown) or other appropriate means. Alternatively, at the second end 24 of the preform assembly 10, the overclad tube 14 and the corresponding end of the preform core rod 12 are heated to form a sealed, unitary structure, e.g., as shown. A vacuum or other pressure gradient then is established across the region between the preform core rod 12 and the overclad tube 14, e.g., by operably coupling a vacuum source 26 to the first end 22 of the overclad tube 14 through the handle 16. In general, the overclad tube 14 is heated while the pressure gradient is maintained across the region between the preform core rod 12 and the overclad tube 14, causing the overclad tube 14 to collapse around the preform core rod 12.

In conventional RIT processes, the collapse of the overclad tube onto the preform core rod typically is performed while the overclad tube and the preform core rod are mounted in a vertical lathe. Alternatively, the collapse of the overclad tube onto the preform core rod is performed in a draw tower furnace, which also is used to draw optical fiber from the resulting optical fiber preform. In this Overclad During Draw (ODD) technique, the combined overclad tube 14 and preform core rod 12 is moved through a draw tower furnace (not shown), beginning with the sealed second end 24. The overclad tube 14 gradually but completely collapses onto the preform core rod 12 prior to optical fiber being drawn from the resulting overclad preform.

According to some ODD processes, the preform core rod 12 is positioned, e.g., vertically, within the overclad tube 14. The forces on the preform core rod 12 include a downward pressure from the weight of the preform core rod 12 and an upward force from the vacuum applied across the region between the preform core rod 12 and the overclad tube 14. Often, the preform core rod 12 moves into the interior portion of the handle 16. In a conventional manner, such movement is reduced by placing a silica disc 28 inside the overclad tube 14 at the first end 22. As discussed previously herein, the disc 28 works to maintain the relative position of the preform core rod 12 and the overclad tube 14 during the collapse of the overclad tube 14 onto the preform core rod 12.

However, as the temperature of the preform assembly 10 increases, e.g., near the end of the fiber draw process as the first end of the preform assembly 10 moves into the hot zone of the furnace, the silica disc 28 and the preform core rod 12 often become soft enough to allow flow into the interior of the handle 16 due to the established vacuum pressure. This movement is sufficient to cause changes in the overall fiber geometry, which often results in degradation of fiber properties to the extent that the fiber drawn therefrom often must be scrapped.

Figure 3B:
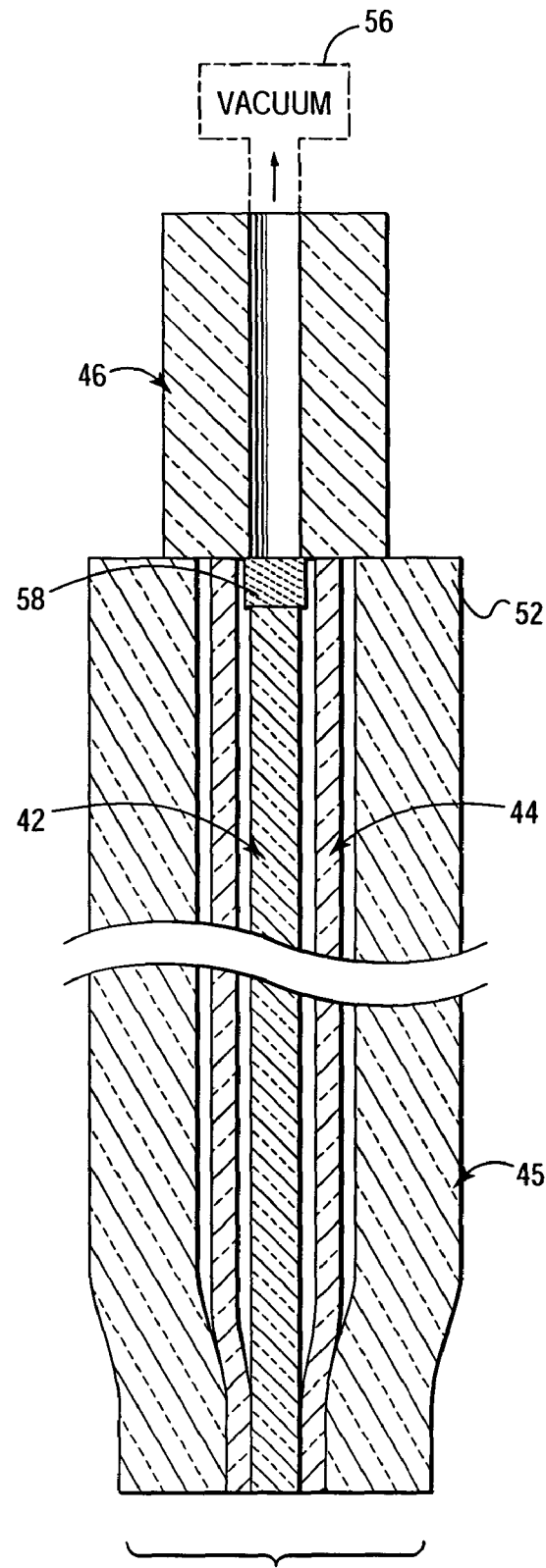
FIG. 3b is a cross-sectional view of a multitube preform core rod assembly according to an alternative embodiment of the invention.

Referring now to FIG. 2, shown is a cross-sectional view of a preform core rod assembly 40 according to embodiments of the invention. The assembly 40 includes a preform core rod 42, typically made of silica with a desired dopant profile, inside of at least one overclad tube 43, typically made of silica. See also FIGS. 3a and 3b, in which embodiment of the invention are shown having multiple overclad tubes 44, 45. It should be understood that, although single and double overclad tube embodiments are shown in FIGS. 2 and 3a–b, respectively, embodiments of the invention include any multiple overclad arrangements.

A handle 46, typically made of silica, is attached to a first end 52 of the overclad tube 43, and typically has a smaller outer diameter and inner diameter than those of the overclad tube 43. A vacuum source 56 is coupled to the handle 46 to establish a vacuum across the region between the preform core rod 42 and the overclad tube 43.

According to embodiments of the invention, the preform assembly 40 also includes a refractory material, e.g., a disc 58 made of a refractory material, positioned inside the overclad tube 43 between the preform core rod 42 and the handle 46. Alternatively, a tube made of a refractory material is positioned inside the overclad tube 43 between the preform core rod 42 and the handle 46. For multiple overclad tube arrangements, the disc 58 is positioned inside the outer overclad tube 45 between the handle 46 and both the preform core rod 42 and the first overclad tube 44 (FIG. 3a). Alternatively, the disc 58 is positioned inside the inner overclad tube 44 between the handle 46 and the preform core rod 42 (FIG. 3b).

The refractory material is made of material having a sufficiently high melting point to reduce movement of the preform core rod 42 into the interior of the handle 46, even at the elevated temperatures that occur at the end of the fiber draw process, i.e., as the first end 52 of the preform assembly 40 moves into the hot zone of the furnace. The refractory material is dimensioned to fit inside of the inner diameter of the overclad tube 43, and configured to allow the vacuum pressure established by the vacuum source 56 to contribute to the collapse of the overclad tube 43 around the preform core rod 42. However, the size and shape of the refractory material is such that it does not become soft enough to allow movement of the preform core rod 42 into the handle 46. The handle 46 maintains the position of the refractory material within the overclad tube 43.

According to embodiments of the invention, the refractory material is made of one or more of the following materials: magnesium oxide (MgO), aluminum oxide ($Al_2O_3$), spinel (MgO—$Al_2O_3$), mullite ($Al_2O_3$—$SiO_2$), yttrium oxide ($Y_2O_3$), zirconium oxide ($ZrO_2$), calcium oxide (CaO), silicon nitride ($Si_3N_4$), silicon carbide (SiC), titanium carbide (TiC) and boron nitride (BN). Preferably, the refractory has a melting point, e.g., greater than approximately 2000 degrees Celsius. With a melting temperature greater than, e.g., conventional silica discs, the refractory material's structure remains sufficiently stable to avoid flow of the refractory material, even at the maximum temperatures reached during the fiber draw process. Thus, the refractory material prevents the preform core rod from moving into the handle 46.

Also, according to embodiments of the invention, the refractory material, in addition to being made of a material having a sufficiently high melting point, is made of a material that does not adversely affect the overall fiber quality or the fiber draw process. For example, the refractory material is made of a material that reduces, minimizes or even eliminates the creation of refractory material particles that may be generated, e.g., during normal preparation of the preform assembly 40. However, it is desirable to have any refractory material particles that are created dissolve or digest into the preform core rod 42 and/or the overclad tube 43 during normal operation of the fiber draw process, with such particle dissolution not adversely affecting the overall fiber quality. The refractory material particles, if not dissolved or digested into the preform core rod 42 or overclad tube 43, often would locate at the interface of the preform core rod 42 and the overclad tube 43, e.g., as the overclad tube 43 is being collapsed onto the preform core rod 42. If such particles were not dissolved, they often would increase the chance of fiber breaks and/or would cause air pockets or airlines at the interface between the preform core 42 and the overclad tube 43, which air pockets may also increase the chance of fiber breaks.

Figure 4:
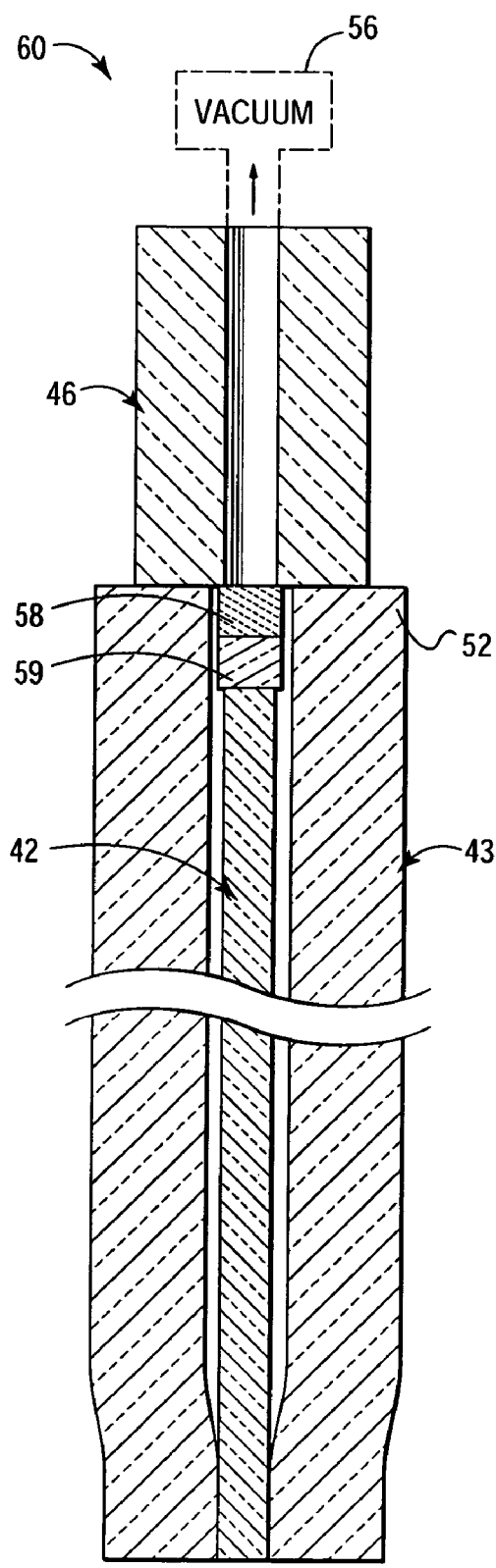
FIG. 4 is a cross-sectional view of a preform core rod assembly according to an alternative embodiment of the invention.

Referring now to FIG. 4, shown is a cross-sectional view of a preform core rod assembly 60 according to an alternative embodiment of the invention. According to alternative embodiments of the invention, the preform core rod 42 is isolated from the refractory material 58, e.g., by a silica disc 59 or other appropriate means. Isolation of the preform core rod 42 from the refractory material reduces the chances of diffusion of the refractory material into the preform core rod 42. The silica disc 59 or other isolation means is of sufficient size and thickness to isolate the refractory material from the preform core rod 42.

Figure 5:
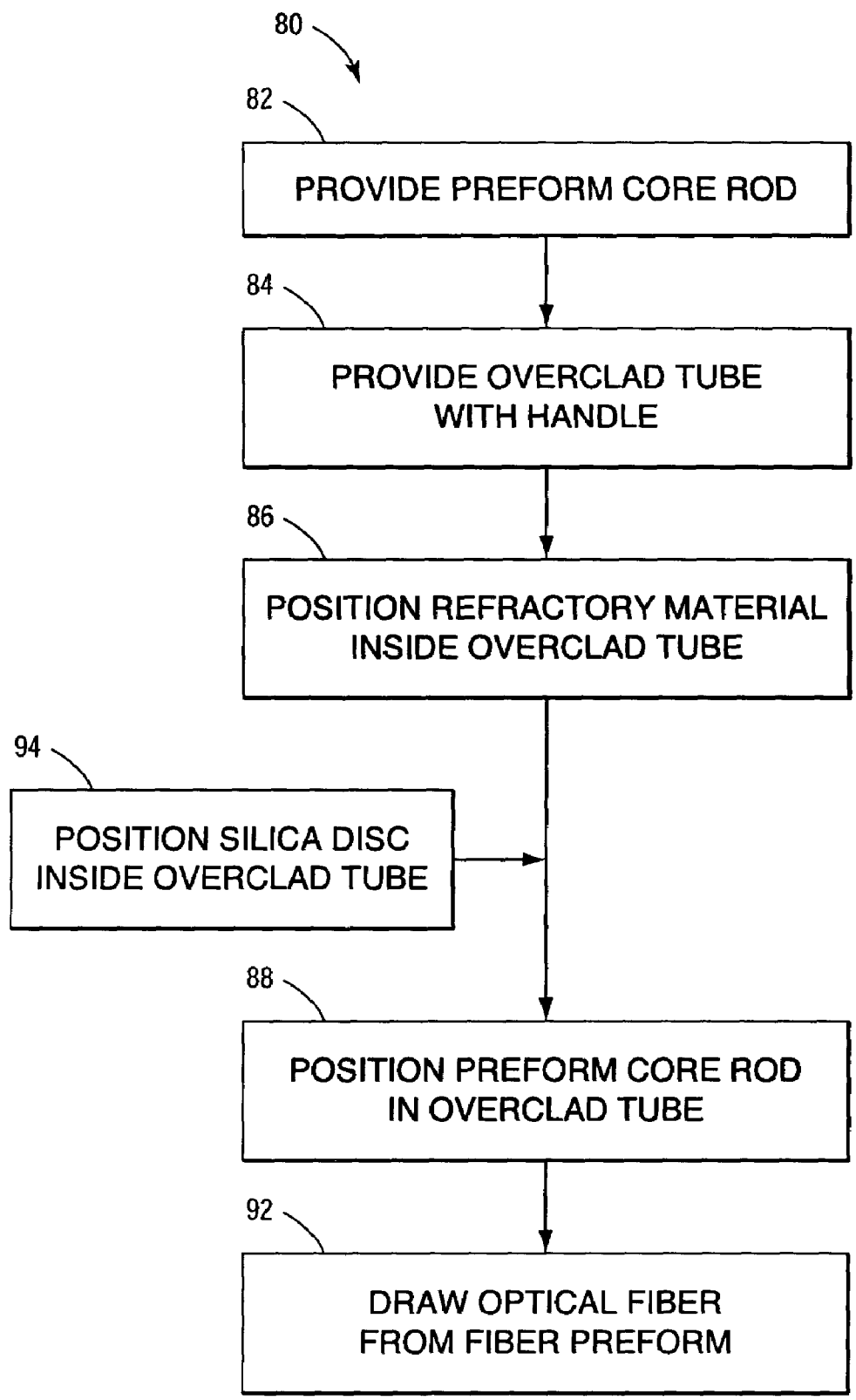
FIG. 5 is a simplified block diagram of a method for making an optical fiber preform assembly according to embodiments of the invention.

Referring now to FIG. 5, shown is a simplified block diagram of a method 80 for making optical fiber according to embodiments of the invention. The method 80 includes a step 82 of forming or providing a preform core rod. As discussed hereinabove, the preform core rod comprises a glass core rod having a core region surrounded by a cladding region. The method 80 also includes a step 84 of providing one or more overclad tubes to be formed around the preform core rod. As discussed hereinabove, the overclad tube includes a handle attached to one end thereof. Typically, the handle has smaller inner and outer diameters than those of the overclad tube.

According to embodiments of the invention, the method 80 also includes the step 86 of positioning a refractory material inside of the overclad tube so that when the preform core rod is positioned in the overclad tube (step 88), the refractory material is positioned between preform core rod and the handle. According to embodiments of the invention, the refractory material reduces movement of the preform core rod during the fiber draw operation. The refractory material is made of, e.g., magnesium oxide and/or aluminum oxide, and has a melting point sufficiently greater than that of the preform core rod, the overclad tube and the handle to prevent movement of the preform core rod into the handle. Preferably, the melting point of the refractory material is greater than approximately 2000 degrees Celsius.

Another step 92 of the method 80 is to draw optical fiber from the overclad preform. As discussed hereinabove, the overclad tube gradually collapses onto the preform core rod using heat and vacuum pressure, and the resulting overclad preform assembly is heated to draw optical fiber therefrom, e.g., in a conventional manner.

According to an alternative embodiment of the invention, the method 80 also includes a step 94 of isolating the preform core rod form the refractory material. The preform core rod is isolated from the refractory material using, e.g., a silica disc or other appropriate isolation means.

It will be apparent to those skilled in the art that many changes and substitutions can be made to the embodiments of the optical fiber and optical fiber fabrication methods herein described without departing from the spirit and scope of the invention as defined by the appended claims and their full scope of equivalents.

The invention claimed is:

1. An optical fiber preform assembly, comprising:
   a preform core rod;
   at least one overclad tube formed around the preform core rod to form an overclad optical fiber preform, the overclad tube having a first end;
   a handle attached to the first end of the overclad tube; and
   a refractory material positioned between the preform core rod and the handle, wherein the refractory material is positioned to reduce movement of the preform core rod into the handle, and wherein the refractory material has a melting temperature sufficiently greater than that of the preform core rod and the overclad tube to prevent flow of the refractory material into the handle when the optical fiber preform assembly is heated.

2. The assembly as recited in claim 1, wherein the refractory material is made of at least one of the materials selected from the group consisting of magnesium oxide (MgO), aluminum oxide ($Al_2O_3$), spinel (MgO—$Al_2O_3$), mullite ($Al_2O_3$—$SiO_2$), yttrium oxide ($Y_2O_3$), zirconium oxide ($ZrO_2$), calcium oxide (CaO), silicon nitride ($Si_3N_4$), silicon carbide (SiC), titanium carbide (TiC) and boron nitride (BN).

3. The assembly as recited in claim 1, wherein the refractory material has a melting temperature greater than approximately 2000 degrees Celsius.

4. The assembly as recited in claim 1, wherein the refractory material comprises a disc positioned between the preform core rod and the handle.

5. The assembly as recited in claim 1, wherein the refractory material comprises a tube positioned between the preform core rod and the handle.

6. The assembly as recited in claim 1, wherein the refractory material is isolated from the preform core rod.

7. The assembly as recited in claim 1, wherein the assembly further comprises a silica disc positioned between the preform core rod and the refractory material, wherein the silica disc isolates the preform core rod from the refractory material.

8. The assembly as recited in claim 1, wherein the handle is made of silica.

* * * * *